US012307957B2

(12) United States Patent
Liao

(10) Patent No.: US 12,307,957 B2
(45) Date of Patent: May 20, 2025

(54) DISPLAY DRIVING CIRCUIT

(71) Applicant: SITRONIX TECHNOLOGY CORP., Jhubei (TW)

(72) Inventor: Min-Nan Liao, Jhubei (TW)

(73) Assignee: Sitronix Technology Corp., Jhubei (TW)

( * ) Notice: Subject to any disclaimer, the term of this patent is extended or adjusted under 35 U.S.C. 154(b) by 0 days.

(21) Appl. No.: 16/518,026

(22) Filed: Jul. 22, 2019

(65) Prior Publication Data

US 2020/0193901 A1 Jun. 18, 2020

Related U.S. Application Data

(60) Provisional application No. 62/701,040, filed on Jul. 20, 2018.

(51) Int. Cl.
*G09G 3/32* (2016.01)
*G09G 3/3225* (2016.01)

(52) U.S. Cl.
CPC ... *G09G 3/3225* (2013.01); *G09G 2310/0243* (2013.01); *G09G 2310/027* (2013.01); *G09G 2330/028* (2013.01)

(58) Field of Classification Search
CPC .. G09G 3/3225; G09G 3/3696; G09G 3/3275; G09G 3/3258; G09G 2310/0243;
(Continued)

(56) References Cited

U.S. PATENT DOCUMENTS 5,745,092 A * 4/1998 Ito ........................ G09G 3/3681 345/211
9,424,774 B2 8/2016 Park
(Continued)

FOREIGN PATENT DOCUMENTS

CN 1504990 A 6/2004
CN 101174837 A 5/2008
(Continued)

OTHER PUBLICATIONS

Communication from the Chinese Patent Office in a counterpart foreign application dated Aug. 4, 2020.
(Continued)

*Primary Examiner* — Lunyi Lao
*Assistant Examiner* — Jarurat Suteerawongsa
(74) *Attorney, Agent, or Firm* — Rosenberg, Klein & Lee

(57) ABSTRACT

The present invention relates to a display driving circuit, which comprises a power circuit a panel driving circuit. The power circuit receives an input voltage, which is the electrical potential difference between a first input electrical potential and a second input electrical potential, and produces a first supply electrical potential and a second supply electrical potential according to the first input electrical potential and the second input electrical potential for providing a supply voltage. The supply voltage is the electrical potential difference between the first supply electrical potential and the second supply electrical potential. The first supply electrical potential is higher than the second supply electrical potential. The second supply electrical potential is between the first input electrical potential and the second input electrical potential. The panel driving circuit is coupled to the first supply electrical potential and the second supply electrical potential for receiving the supply voltage and generating a plurality of driving signals.

12 Claims, 4 Drawing Sheets

(58) Field of Classification Search
CPC ..... G09G 2310/027; G09G 2310/0289; G09G 2310/0291; G09G 2330/028; G09G 2320/0242; G09G 2320/0673; G09G 3/32
See application file for complete search history.

(56) References Cited

U.S. PATENT DOCUMENTS

| | | | | |
|---|---|---|---|---|
| 2002/0186230 | A1* | 12/2002 | Kudo | G09G 3/3607 345/690 |
| 2005/0007393 | A1* | 1/2005 | Akai | G09G 3/3291 345/690 |
| 2007/0018933 | A1* | 1/2007 | Lee | G09G 3/3696 345/98 |
| 2007/0146395 | A1* | 6/2007 | Lee | G09G 3/2007 345/690 |
| 2007/0257875 | A1* | 11/2007 | Hsieh | G09G 3/3685 345/89 |
| 2008/0198118 | A1* | 8/2008 | Choi | G09G 3/3696 345/89 |
| 2011/0141098 | A1* | 6/2011 | Yaguma | G09G 3/3688 345/212 |
| 2011/0175943 | A1* | 7/2011 | Ahn | G09G 3/20 345/690 |
| 2011/0193844 | A1* | 8/2011 | Lee | G09G 3/3696 345/211 |
| 2013/0249969 | A1* | 9/2013 | Jeon | G09G 3/3685 345/99 |
| 2014/0192095 | A1* | 7/2014 | Liao | G09G 3/3696 345/690 |
| 2014/0253423 | A1* | 9/2014 | Kinsho | G09G 3/3688 345/89 |
| 2016/0335942 | A1* | 11/2016 | Cho | G09G 3/2007 |
| 2017/0039951 | A1 | 2/2017 | Park | |
| 2018/0204535 | A1* | 7/2018 | Liao | G09G 3/3696 |

FOREIGN PATENT DOCUMENTS

| | | | | |
|---|---|---|---|---|
| CN | 101416231 | A | | 4/2009 |
| CN | 101551982 | A | | 10/2009 |
| CN | 102789754 | A | * | 11/2012 |
| CN | 107256698 | A | | 10/2017 |
| TW | 201732775 | A | | 9/2017 |

OTHER PUBLICATIONS

Communication from the Taiwan Patent Office in a counterpart foreign application dated (Taiwan Year 109) Nov. 28, 2020.

* cited by examiner

DISPLAY DRIVING CIRCUIT

FIELD OF THE INVENTION

The present invention relates generally to a driving circuit, and particularly to a display driving circuit.

BACKGROUND OF THE INVENTION

In recent years, since the resolution of a display panel increases continuously, namely, the pixel number of a display panel increases, the area of each pixel decreases continuously. Given the limited pixel area, the number of circuit devices contained in a pixel of a display panel is limited. Consequently, according to the current technology, the circuit in a pixel is simplified, which also simplifies the functions of the circuit in a pixel and the driving chips, for example, the driving chips for active-matrix organic light-emitting diode (AMOLED) display panels, need to produce higher driving voltages to the display panel. To meet the requirement of higher driving voltages for a display panel, a higher input electrical potential should be supplied to the driving chips for producing a higher driving voltage, which means a high voltage process is required to fabricate the circuit devices of the driving chips. Unfortunately, to adopt a high voltage process to fabricate chips leads to larger device size, higher manufacturing costs, and limited yield of driving chips. In other word, the costs of driving chips will be increased substantially and the production capacity will be reduced.

Accordingly, the present invention provides a display driving circuit, which may produce supply voltages with higher electrical potentials and smaller electrical potential difference as the power for the driving circuit. Thereby, a low voltage process may be adopted to fabricate the driving circuits, and hence reducing costs and increasing production capacity.

SUMMARY

An objective of the present invention is to provide a display driving circuit, which produces a first supply electrical potential and a second supply electrical potential for providing a supply voltage as the power for a driving circuit. Since the electrical potential difference between the first supply electrical potential and the second supply electrical potential is small, a low voltage process may be selected to fabricate the display driving circuit and hence lowering device size and manufacturing costs and improving production efficiency.

The present invention discloses a display driving circuit, which comprises a power circuit and a panel driving circuit. The power circuit receives an input voltage, which is the electrical potential difference between a first input electrical potential and a second input electrical potential, and produces a first supply electrical potential and a second supply electrical potential according to the first input electrical potential and the second input electrical potential for providing a supply voltage. The supply voltage is the electrical potential difference between the first supply electrical potential and the second supply electrical potential. The first supply electrical potential is higher than the second supply electrical potential. The second supply electrical potential is between the first input electrical potential and the second input electrical potential. The panel driving circuit is coupled to the first supply electrical potential and the second supply electrical potential for receiving the supply voltage and generating a plurality of driving signals.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences on a device in whole technique are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected to the second device directly, or the first device is connected to the second device via other device or connecting means indirectly.

Figure 1:
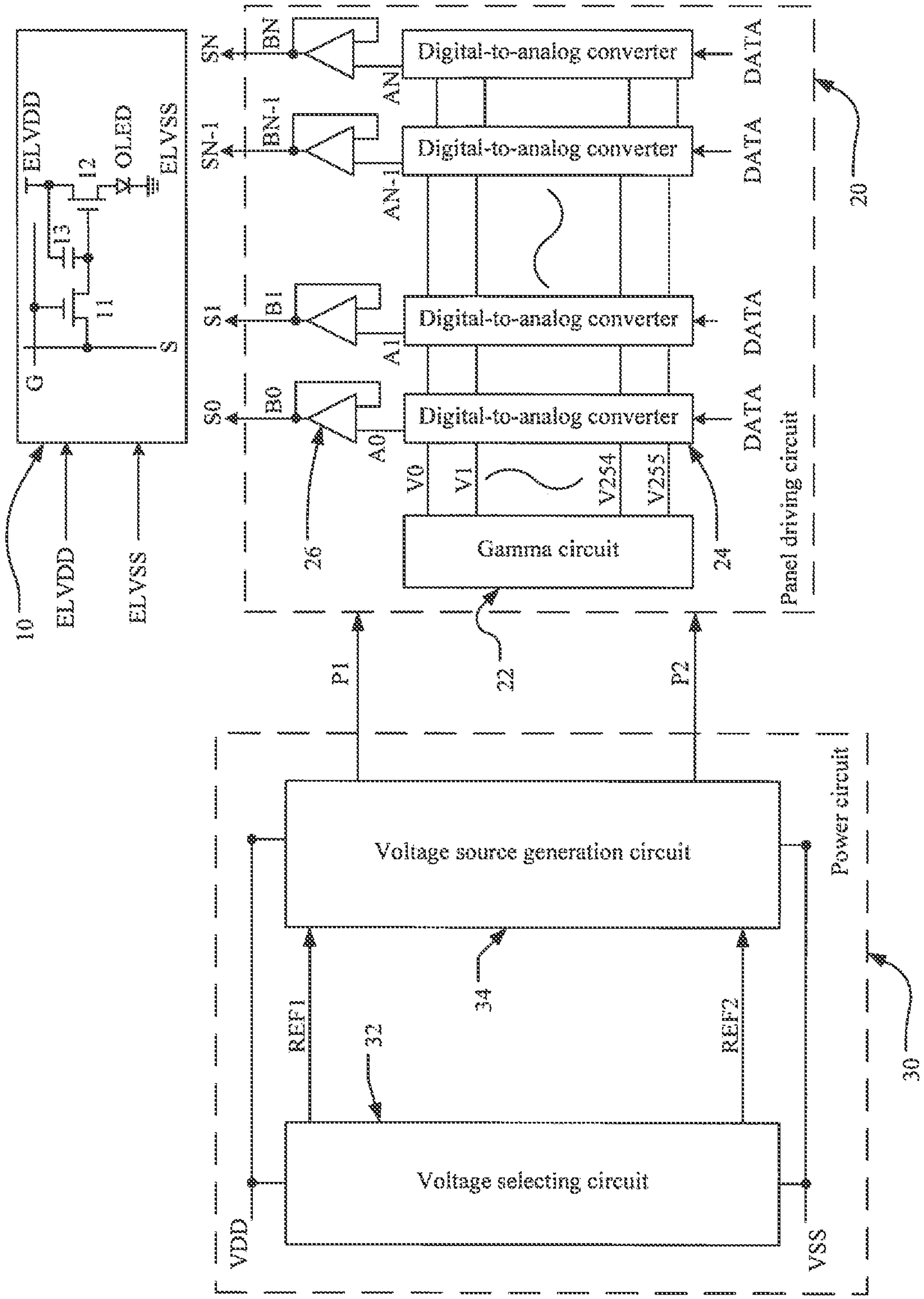
FIG. 1 shows a schematic diagram of the display driving circuit according to the first embodiment of the present invention.

Please refer to FIG. 1, which shows a schematic diagram of the display driving circuit according to the first embodiment of the present invention. As shown in the figure, the display device includes a display panel 10 and a display driving circuit. The display panel 10 may be a panel of various types. According to the embodiment in FIG. 1, an AMOLED panel is adopted for illustration. The display panel 10 includes a plurality of pixel structures. According to an embodiment, each pixel structure includes two transistors 11, 12, a capacitor 13, and an organic light-emitting diode (OLED). Namely, it is a 2T1C pixel structure. Nonetheless, the present invention is not limited to the embodiment. The transistor 11 is coupled to a scan line and a source line for receiving a scan signal G and a source signal S. One terminal of the capacitor 13 is coupled to the connection point of the two transistors 11, 12 while the other terminal connected to a first driving electrical potential ELVDD. Thereby, the capacitor 13 controls the voltage of a gate of the transistor 12. The transistor 12 is coupled to the first driving electrical potential ELVDD and to one terminal of the OLED. The other terminal of the OLED is coupled to a second driving electrical potential ELVSS. Hence, after the scan signal G controls the transistor 11 to turn on, the source signal S controls the transistor 12 to turn on for allowing the charges to pass from the first driving electrical potential ELVDD through the OLED to the second driving electrical potential ELVSS and thus driving the OLED to generate light.

According to a different embodiment, each pixel structure of the display panel 10 may include a plurality of transistors and a capacitor for completing various compensation, for example, initial driving voltage compensation or transistor threshold voltage compensation. Nonetheless, since the resolution is increased and the area of the pixel structure is shrunk, the pixel structures of the display panel 10 cannot accommodate more electronic devices, which leads to unavailability of the compensation for the pixel structures. Accordingly, the display driving circuit according to the present invention is coupled to a first input electrical potential VDD and a second input electrical potential VSS for receiving an input voltage, which is the electrical potential difference between the first input electrical potential VDD and the second input electrical potential VSS. The first input electrical potential VDD is higher than the second input electrical potential VSS. According to an embodiment of the present invention, the second input electrical potential VSS may be fixed to a ground level.

The display driving circuit produces a first supply electrical potential P1 and a second supply electrical potential P2 according to the first input electrical potential VDD and the second input electrical potential VSS for providing a supply voltage. The supply voltage is the electrical potential difference between the first supply electrical potential P1 and the second supply electrical potential P2. The first supply electrical potential P1 is higher than the second supply electrical potential P2. The second supply electrical potential P2 is between the first input electrical potential VDD and the second input electrical potential VSS. In addition, the display driving circuit uses the electrical potential difference between the first supply electrical potential P1 and the second supply electrical potential P2 to be the supply voltage and produces a plurality of driving signals S0, S1, . . . SN−1, SN. The driving signals S0, S1, . . . SN−1, SN according to the embodiment in FIG. 1 are a plurality of buffer voltages B0, B1, . . . BN−1, BN produced by a plurality of buffer circuits 26. The display driving circuit is coupled to the display panel 10 for outputting the driving signals S0, S1, . . . SN−1, SN to a plurality of source lines of the display panel 10, acting as the source signal for driving the display panel 10 to display images. Besides, the second supply electrical potential P2 is higher than the second input electrical potential VSS; the second input electrical potential VSS is higher than or equal to the second driving electrical potential ELVSS. In other words, the second supply electrical potential P2 is higher than the second driving electrical potential ELVSS.

To solve the problem of unable to self-compensate in the pixel structures, the voltage level of the source signal S should be increased. Namely, the voltage levels of the driving signals S0, S1, . . . SN−1, SN of the display driving circuit should be increased. If the OLED should be driven normally by the source signal S being raised to 8V, it means that the driving signals S0, S1, . . . SN−1, SN should be raised to 8V. Thereby, the input voltage received by the display driving circuit should be raised to 8V. Nonetheless, according to the present invention, the second supply electrical potential P2 is higher than the second input electrical potential VSS, and thereby the internal elements of the display driving circuit need not to withstand the 8V. For example, the internal elements of the panel driving circuit 20 all use the electrical potential difference between the first supply electrical potential P1 and the second supply electrical potential P2 as the power source. The internal elements of the panel driving circuit 20 withstands voltage, which is the electrical potential difference between the first supply electrical potential P1 and the second supply electrical potential P2. In other words, it is not required to adopt a high voltage process to fabricate the internal elements of the display driving circuit. The display driving circuit may be a display driving chip.

The display driving circuit (or the display driving chip) comprises a panel driving circuit 20 and a power circuit 30. The power circuit 30 is coupled to the first input electrical potential VDD and the second input electrical potential VSS for receiving the input voltage. The power circuit 30 is further coupled to the panel driving circuit 20 and produces the first supply electrical potential P1 and the second supply electrical potential P2 to the panel driving circuit 20 according to the first input electrical potential VDD and the second input electrical potential VSS, and thus providing the supply voltage to the panel driving circuit 20. The panel driving circuit 20 is coupled to the display panel 10 and uses the electrical potential difference between the first supply electrical potential P1 and the second supply electrical potential P2 (the supply voltage) as the power source for producing the driving signals S0, S1, . . . SN−1, SN to the display panel 10. Then driving signals S0, S1, . . . SN−1, SN drive the display panel 10 to display images.

The power circuit 30 includes a voltage selecting circuit 32 and a voltage source generation circuit 34. The voltage selecting circuit 32 is coupled to the voltage source generation circuit 34, as well as the first input electrical potential VDD and the second input electrical potential VSS, for receiving the input voltage, and produces a high reference electrical potential REF1 and a low reference electrical potential REF2 to the voltage source generation circuit 34 according to the first input electrical potential VDD and the second input electrical potential VSS (the input voltage). The high reference electrical potential REF1 is higher than the low reference electrical potential REF2. The voltage source generation circuit 34 is coupled to the panel driving circuit 20, the first input electrical potential VDD, the second input electrical potential VSS, the high reference electrical potential REF1, and the low reference electrical potential REF2. The voltage source generation circuit 34 produces the first supply electrical potential P1 and the second supply electrical potential P2 to the panel driving circuit 20 according to the high reference electrical potential REF1 and the low reference electrical potential REF2, respectively.

In addition, the voltage source generation circuit 34 produces the first supply electrical potential P1 according to the input voltage and the high reference electrical potential REF1. The electrical potential difference between the first supply electrical potential P1 and a reference electrical potential is a first output voltage. The voltage source generation circuit 34 produces the second supply electrical potential P2 according to the input voltage and the low reference electrical potential REF2. The electrical potential difference between the second supply electrical potential P2 and the reference electrical potential is a second output voltage. In other words, the power circuit 30 produces the first output voltage and the second output voltage according to the input voltage. According to an embodiment of the present invention, the reference electrical potential may be the second input electrical potential VSS. Besides, for the voltage selecting circuit 32, the electrical potential difference between the high reference electrical potential REF1 and the second input electrical potential VSS is a high reference voltage, and the electrical potential difference between the low reference electrical potential REF2 and the second input electrical potential VSS is a low reference voltage. According to another embodiment of the present invention, the above reference electrical potential may be not the second input electrical potential VSS.

Please refer again to FIG. 1. The panel driving circuit 20 includes a gamma circuit 22, a plurality of digital-to-analog converters 24, and the buffer circuits 26. The panel driving circuit 20 is coupled to the first supply electrical potential P1 and the second supply electrical potential P2 of the power circuit 30 for receiving the supply voltage as the power source. The gamma circuit 22 produces a plurality of gamma voltages V0, V1, . . . V254, V255 according to the supply voltage. The digital-to-analog converts 24 receives a plurality of pixel data DATA and is coupled between the gamma circuit 22 and the buffer circuits 26. The digital-to-analog converts 24 select the gamma voltages V0, V1, . . . V254, V255 according to the pixel data DATA for generating a plurality of pixel signals A0, A1, . . . AN−1, AN to the buffer circuits 26, The buffer circuits 26 buffer the pixel signals A0, A1, . . . AN−1, AN for generating the buffer voltages B0, B1, . . . BN−1, BN, which act as the driving signals S0, S1, . . . SN−1, SN for driving the display panel 10.

Figure 2:
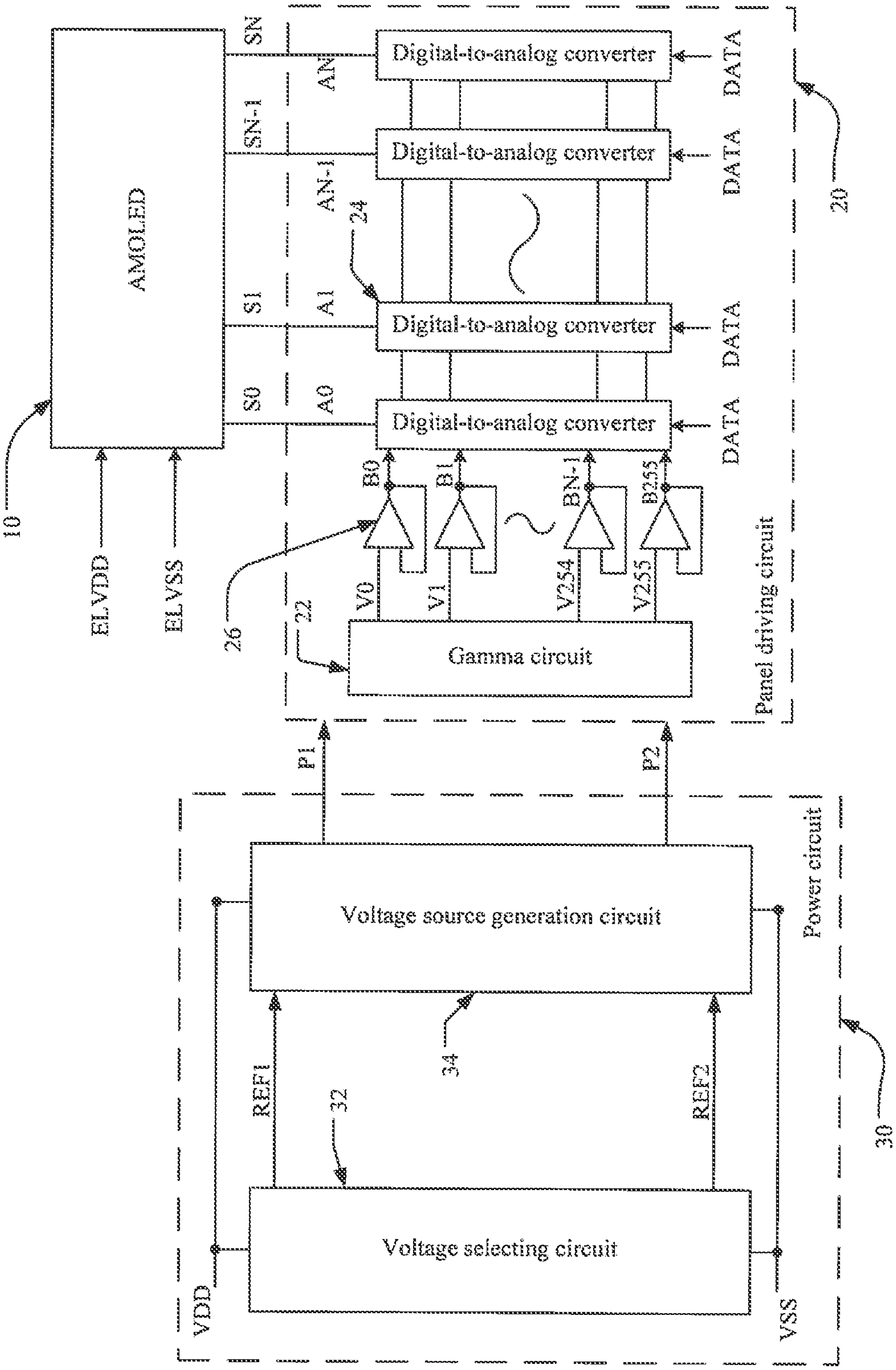
FIG. 2 shows a schematic diagram of the display driving circuit according to the second embodiment of the present invention.

Please refer to FIG. 2, which shows a schematic diagram of the display driving circuit according to the second embodiment of the present invention. As shown in the figure, the difference between the embodiment in FIG. 2 and the one in FIG. 1 is that the locations of the buffer circuits 26 and the digital-to-analog converters 24 are different. Namely, the circuit connections among the gamma circuit 22, the buffer circuits 26, and the digital-to-analog converters 24 are different. The buffer circuits 26 according to the embodiment in FIG. 2 are coupled between the digital-to-analog converters 24 and the gamma circuit 22. Thereby, the gamma circuit 22 is coupled to the buffer circuits 26 and outputs the buffer voltages V0, V1, . . . V254, V255 to the buffer circuits 26, respectively. The buffer circuits 26 buffer the gamma voltages V0, V1, . . . V254, V255, respectively, for producing the buffer voltages B0, B1, . . . BN−1, BN (B255). Since the number of the gamma voltages V0, V1, . . . V254, V255 is 256, the buffer voltages B0, B1, . . . BN−1, BN range from B0 to B255. The digital-to-analog converters 24 are coupled to the output terminals of the buffer circuits 26 for receiving the buffer voltages B0, B1, . . . BN−1, BN. The digital-to-analog converters 24 receives the pixel data DATA, and select the buffer voltages B0, B1, . . . BN−1, BN according to the pixel data DATA for generating the pixel signals A0, A1, . . . AN−1, AN to the display panel 10. According to the present embodiment, the pixel signals A0, A1, . . . AN−1, AN are the driving signals S0, S1, . . . SN−1, SN.

Figure 3:
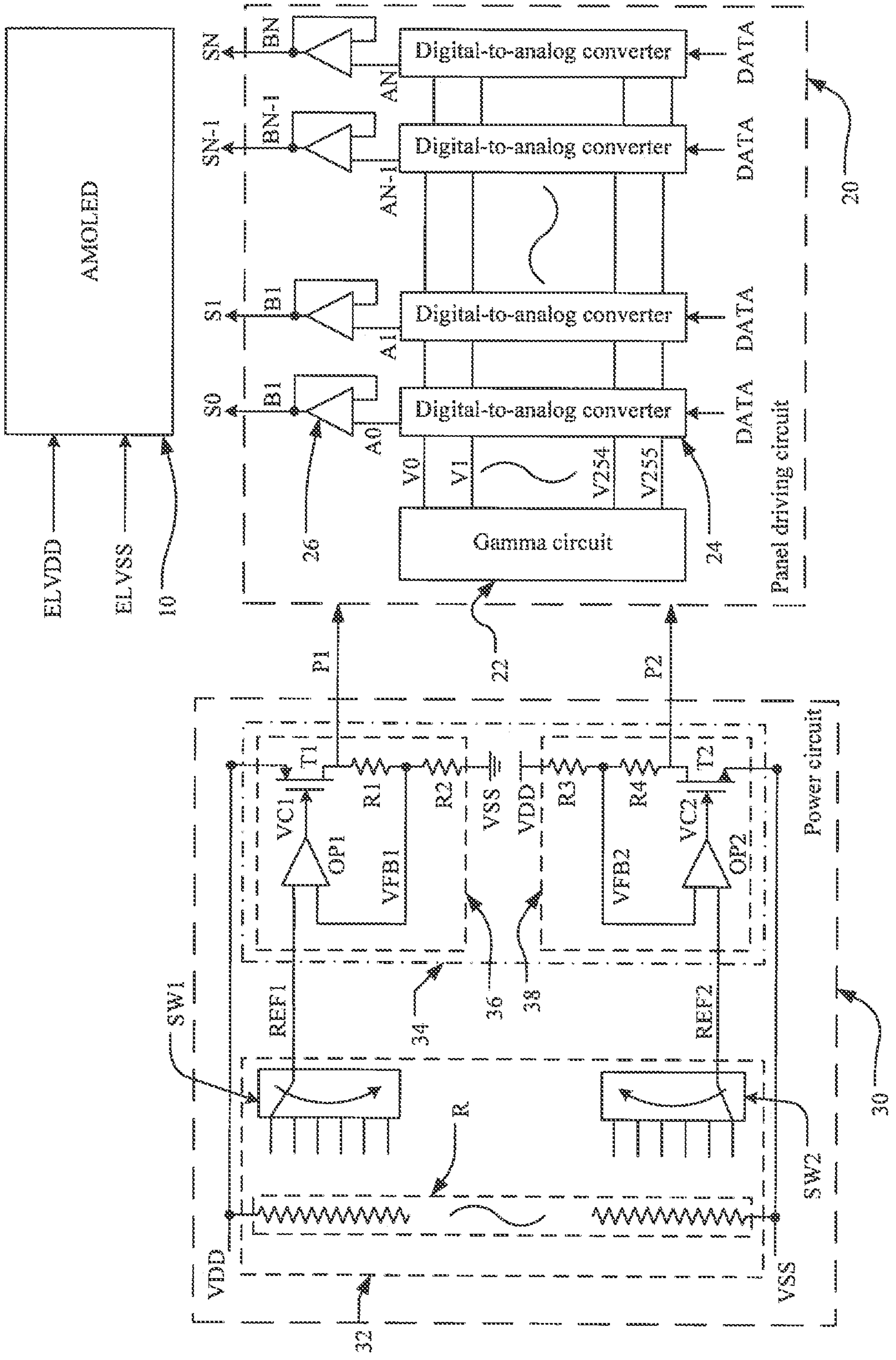
FIG. 3 shows a schematic diagram of the power circuit according to the first embodiment of the present invention.

Please refer to FIG. 3, which shows a schematic diagram of the power circuit according to the first embodiment of the present invention. As shown in the figure, the input voltage is the electrical potential difference between the first input electrical potential VDD and the second input electrical potential VSS. The power circuit 30 receives the input voltage for producing the first output voltage and the second output voltage. The first output voltage is the electrical potential difference between the first supply electrical potential P1 and the reference electrical potential; the second output voltage is the electrical potential difference between the second supply electrical potential P2 and the reference electrical potential. The reference electrical potential according to the embodiment may be the second input electrical potential VSS. The first supply electrical potential P1 and the second supply electrical potential P2 are both between the first input electrical potential VDD and the second input electrical potential VSS. In other words, the elements in the power circuit 30 need not to withstand the electrical potential difference between the first input electrical potential VDD and the second input electrical potential VSS. The power circuit 30 is used for providing the supply voltage to the panel driving circuit 20 as the power source. Thereby, the panel driving circuit 20 is coupled to the first supply electrical potential P1 and the second supply electrical potential P2. The electrical potential difference between the first supply electrical potential P1 and the second supply electrical potential P2 is the supply voltage. The panel driving circuit 20 receives the supply voltage for producing the driving signals S0, S1, . . . SN−1, SN.

The panel driving circuit 20 includes a ground terminal, which may be the common ground terminal of the gamma circuit 22, the digital-to-analog converters 24, and the buffer circuits 26. Alternatively, the gamma circuit 22, the digital-to-analog converters 24, and the buffer circuits 26 may be connected to different ground terminals. The present invention does not limit the connection to the ground terminal. In addition, no matter how many ground terminals the panel driving circuit 20 connects to, the electrical potentials of the ground terminals are higher than the second input electrical potential VSS and act as the reference electrical potential for the operations of the panel driving circuit 20. For example, the ground terminal may be coupled to the second supply electrical potential P2. Thereby, when the first supply electrical potential P1 is equal to the first input electrical potential VDD, the panel driving circuit 20 still need not to withstand the electrical potential difference between the first input electrical potential VDD and the second input electrical potential VSS. Instead, it only need to withstand a lower electrical potential difference between the first input electrical potential VDD (the first supply voltage P1) and the second supply electrical potential P2. Accordingly, the electrical potential difference between the first supply electrical potential P1 and the second supply electrical potential P2 is smaller than the electrical potential difference between the first input electrical potential VDD and the second input electrical potential VSS.

The display panel 10 includes a ground terminal and receives the first driving electrical potential ELVDD and the second driving electrical potential ELVSS. The first driving electrical potential ELVDD is higher than the second driving electrical potential ELVSS. The ground terminal of the display panel 10 is coupled to a panel reference electrical potential. According to an embodiment of the present invention, the panel reference electrical potential may be the second driving electrical potential ELVSS, which may be equal to the second input electrical potential VSS. Thereby, the ground terminal of the display panel 10 may be coupled to the second input electrical potential VSS, which acts as the reference electrical potential for the operations of the display panel 10. The second input electrical potential VSS may be fixed to the ground electrical potential, which is, likewise, lower than the second supply electrical potential P2. Besides, the ground electrical potential may be the level of 0V. Thereby, the display driving circuit may withstand a lower voltage in operations while still outputting the driving signals S0, S1, . . . SN−1, SN meeting the requirements by the display panel 10. If the voltage of a source signal S required by the display panel 10 is 8V, the power circuit 30 receives the input voltage of 8V and outputs the first output voltage of 8V and the second output voltage of 3V. In addition, the supply voltage is the electrical potential difference between the first supply electrical potential P1 (8V) and the second supply electrical potential P2 (3V), namely, 5V. The driving signals output by the panel driving circuit 20 may reach as high as 8V. When the display panel 10 operates, the voltage received by the pixel structures is the electrical potential difference between the source signal S and the second driving electrical potential ELVSS, which is a higher voltage. The electrical potential difference between the first supply electrical potential P1 and the second supply electrical potential P2 is smaller than the electrical potential difference between the first input electrical potential VDD and the second input electrical potential VSS. Thereby, the display driving circuit according to the present invention may be fabricated by using a low voltage process.

Please refer again to FIG. 3. The voltage selecting circuit 32 is coupled to the first input electrical potential VDD and the second input electrical potential VSS for receiving the input voltage and producing the high reference electrical potential REF1 and the low reference electrical potential REF2 according to the input voltage. The voltage selecting circuit 32 includes a voltage dividing circuit and a switching circuit. The voltage dividing circuit includes a plurality of resistors R; the switching circuit includes a plurality of switches SW1, SW2. The resistors R are connected in series and coupled to the first input electrical potential VDD and the second input electrical potential VSS for dividing the input voltage and producing a plurality of divided electrical potentials. The switching circuit is coupled to the voltage dividing circuit. Namely, the switches SW1, SW2 are coupled to the connection nodes of the resistors R for coupling to the divided electrical potentials. The switches SW1, SW2 switch the divided electrical potentials. That is to say, the switches SW1, SW2 select two divided electrical potentials as the high reference electrical potential REF1 and the low reference electrical potential REF2. By using the switching signal to switch the switches SW1, SW2 to different connection nodes of the resistors R, the high reference electrical potential REF1 and the low reference electrical potential REF2 may be adjusted correspondingly. Thereby, the voltage selecting circuit 32 may change the first supply electrical potential P1 and the second supply electrical potential P2. Besides, the switching signal may be generated by a timing controller or other circuits.

The voltage source generation circuit 34 is coupled to the panel driving circuit 20 and the voltage selecting circuit 32, and to the first input electrical potential VDD, the second input electrical potential VSS, the high reference electrical potential REF1, and the low reference electrical potential REF2. The voltage source generation circuit 34 produces the first supply electrical potential P1 to the panel driving circuit 20 according to the high reference electrical potential REF. The voltage source generation circuit 34 produces the second supply electrical potential P2 to the panel driving circuit 20 according to the low reference electrical potential REF2. The voltage source generation circuit 34 includes a first voltage source circuit 36 and a second voltage source circuit 38, The first voltage source circuit 36 is coupled to the first input electrical potential VDD, the second input electrical potential VSS, the high reference electrical potential REF1, and a first feedback electrical potential VFB1, and produces the first supply electrical potential P1 according to the first feedback electrical potential VFB1 and the high reference electrical potential REF1. The second voltage source circuit 38 is coupled to the first input electrical potential VDD, the second input electrical potential VSS, the low reference electrical potential REF2, and a second feedback electrical potential VFB2, and produces the second supply electrical potential P2 according to the second feedback electrical potential VFB2 and the low reference electrical potential REF2.

The first voltage source circuit 36 includes a first operational circuit OP1, a first output element T1, and a first voltage dividing circuit. The first operational circuit OP1 includes a first input terminal, a second input terminal, and an output terminal. The first input terminal of the first operational circuit OP1 is coupled to the first feedback electrical potential VFB1; the second input terminal thereof is coupled to the high reference electrical potential REF1; and the output terminal thereof outputs a first control signal VC1. The first output element T1 is coupled to the first input electrical potential VDD and the output terminal of the first operational circuit OP1. The first control signal VC1 controls the gate of the first output element T1. Thereby, the first output element T1 produces the first supply electrical potential P1 according to the first control signal VC1 and the first input electrical potential VDD. According to an embodiment of the present invention, the first output element T1 may be a transistor. The first voltage dividing circuit may include two resistors R1, R2 connected in series and coupled between the first supply electrical potential P1 and the second input electrical potential VSS. The first voltage dividing circuit is coupled to the first output element T1 and the first input terminal of the first operational circuit OP1. Thereby, the first voltage dividing circuit divides the electrical potential difference (the first output voltage) between the first supply electrical potential P1 and the second input electrical potential VSS for producing the first feedback electrical potential VFB1 to the first input terminal of the first operational circuit OP1.

The second voltage source circuit 38 includes a second operational circuit OP2, a second output element T2, and a second voltage dividing circuit. The second operational circuit OP2 includes a first input terminal, a second input terminal, and an output terminal. The first input terminal of the second operational circuit OP2 is coupled to the second feedback electrical potential VFB2; the second input terminal thereof is coupled to the low reference electrical potential REF2; and the output terminal thereof outputs a second control signal VC2. The second output element T2 is coupled to the second input electrical potential VSS and the output terminal of the second operational circuit OP2. The second control signal VC2 controls the gate of the second output element T2. Thereby, the second output element T2 produces the second supply electrical potential P2 according to the second control signal VC2 and the second input electrical potential VSS. According to an embodiment of the present invention, the second output element T2 may be a transistor. The second voltage dividing circuit may include two resistors R3, R4 connected in series and coupled between the first input electrical potential VDD and the second supply electrical potential P2. The second voltage dividing circuit is coupled to the second output element T2 and the first input terminal of the second operational circuit OP2. Thereby, the second voltage dividing circuit divides the electrical potential difference between the second supply electrical potential P2 and the first input electrical potential VDD for producing the second feedback electrical potential VFB2 to the first input terminal of the second operational circuit OP2.

Figure 4:
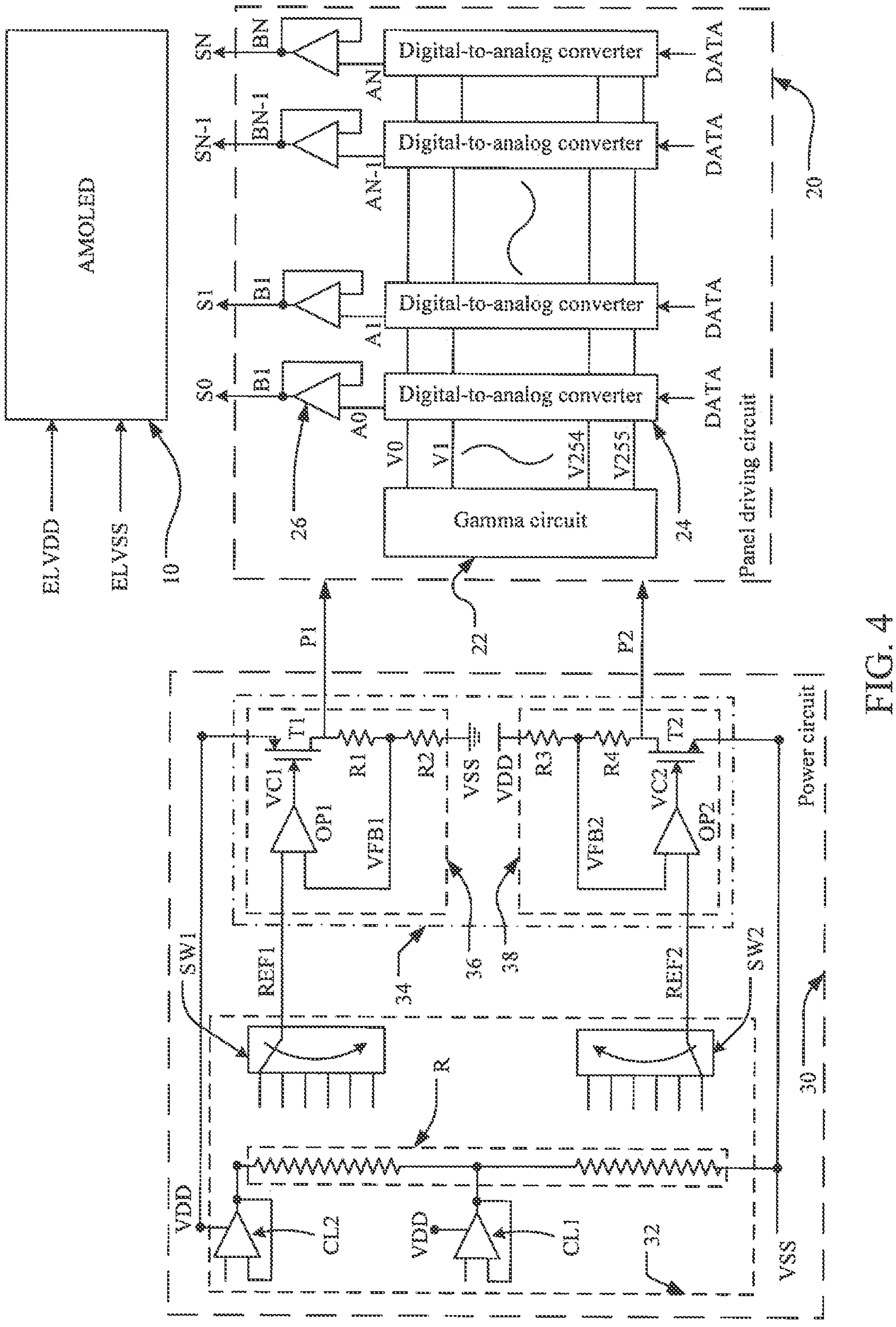
FIG. 4 shows a schematic diagram of the power circuit according to the second embodiment of the present invention.

Please refer to FIG. 4, which shows a schematic diagram of the power circuit according to the second embodiment of the present invention. As shown in the figure, the voltage selecting circuit 32 may include a voltage regulator CL1 coupled between the resistors R of the voltage dividing circuit. Thereby, the voltage regulator CL clamps the electrical potential of one of the connection nodes of the resistors R connected in series to a predetermined electrical potential and thus clamping a voltage dividing range of the resistors R. Please refer again to FIG. 3, which shows an embodiment without the voltage regulator CL1. The voltage dividing circuit may include 8 resistors R. When the input voltage is 8V, the voltage dividing range of the upper four resistors R is 8V to 4V while the voltage dividing range of the lower four resistors R is 4V to the second input electrical potential VSS. Please refer again to FIG. 4, which shows an embodiment with the voltage regulator CL1. The voltage dividing circuit may include 8 resistors R. If the input voltage is 8V, the output terminal of the voltage regulator CL1 may be coupled between the fourth and the fifth resistors R and outputs one voltage of 5V. Thereby, the voltage dividing range of the upper four resistors R is 8V to 5V while the voltage dividing range of the lower four resistors R is 5V to the second input electrical potential VSS. It means that the voltage dividing ranges of the upper and lower four resistors change from 4V and 4V to 3V and 5V, respectively.

Furthermore, the voltage selecting circuit 32 may include a plurality of voltage regulators CL1, CL2. In addition to the voltage regulator CL1 as described above, another voltage regulator CL2 may be further disposed to the topmost terminal of the resistors R. In other words, the voltage regulator CL2 is coupled to the first input electrical potential VDD for adjusting the maximum electrical potential coupled by the resistors R. For example, the first input electrical potential VDD is 8V with respect to the second input electrical potential VSS; the maximum electrical potential coupled by the resistors R is 7V with respect to the second input electrical potential VSS. According to an embodiment of the present invention, the voltage regulators CL1, CL2 may be operational amplifier.

To sum up, the present invention discloses a display driving circuit, which comprises a power circuit a panel driving circuit. The power circuit receives an input voltage, which is the electrical potential difference between a first input electrical potential and a second input electrical potential, and produces a first supply electrical potential and a second supply electrical potential according to the first input electrical potential and the second input electrical potential for providing a supply voltage. The first supply electrical potential is higher than the second supply electrical potential. The second supply electrical potential is between the first input electrical potential and the second input electrical potential. The panel driving circuit is coupled to the first supply electrical potential and the second supply electrical potential for receiving the supply voltage and generating a plurality of driving signals.

However, the foregoing description is only embodiments of the present invention, not used to limit the scope and range of the present invention. Those equivalent changes or modifications made according to the circuit, structure, feature, or spirit described in the claims of the present invention are included in the appended claims of the present invention.

The invention claimed is:

1. A display driving circuit, comprising:

a power circuit, receiving an input voltage, said input voltage being the electrical potential difference between a first input electrical potential and a second input electrical potential, producing a first reference electrical potential and a second reference electrical potential according to said first input electrical potential and said second input electrical potential, producing only a first supply electrical potential and only a second supply electrical potential according to said first input electrical potential said second input electrical potential, said first reference electrical potential and said second reference electrical potential for providing a supply voltage, said supply voltage being the electrical potential difference between said first supply electrical potential and said second supply electrical potential, said first supply electrical potential being higher than said second supply electrical potential, and said second supply electrical potential being between said first input electrical potential and said second input electrical potential, said first reference electrical potential being higher than said second reference electrical potential; and a panel driving circuit, coupled to said first supply electrical potential and said second supply electrical potential of said power circuit for receiving said supply voltage and generating a plurality of driving signals;

wherein said panel driving circuit includes:

a gamma circuit directly coupled to said first supply electrical potential and said second supply electrical potential of said power circuit, and producing a plurality of gamma voltages solely based upon the difference of said first and said second supply electrical potentials;

a plurality of digital-to-analog converters, coupled to said gamma circuit, receiving said gamma voltages and a plurality of pixel data, and selecting said gamma voltages according to said pixel data for generating a plurality of pixel signals; and a plurality of buffer circuits, coupled to said digital-to-analog converters, and buffering said pixel signals for generating said driving signals.

2. The display driving circuit of claim 1, wherein the electrical potential difference between said first supply electrical potential and said second supply electrical potential is smaller than the electrical potential difference between said first input electrical potential and said second input electrical potential.

3. The display driving circuit of claim 1, wherein said panel driving circuit includes a ground terminal coupled to said second supply electrical potential.

4. The display driving circuit of claim 3, wherein said panel driving circuit is coupled to a display panel; said display panel includes a ground terminal coupled to a panel reference electrical potential; and said panel reference electrical potential is lower than said second supply electrical potential.

5. The display driving circuit of claim 4, wherein said panel reference electrical potential is said second input electrical potential; and said second input electrical potential is fixed to a ground electrical potential.

6. The display driving circuit of claim 1, wherein said power circuit includes:

a voltage selecting circuit, coupled to said first input electrical potential and said second input electrical potential, receiving said input voltage, and producing said first reference electrical potential and said second reference electrical potential according to said input voltage; and a voltage source generation circuit, coupled to said panel driving circuit and said voltage selecting circuit, coupled to said first input electrical potential, said second input electrical potential, said first reference electrical potential, and said second reference electrical potential, producing said first supply electrical potential according to said first reference electrical potential, and producing said second supply electrical potential according to said second reference electrical potential.

7. The display driving circuit of claim 6, wherein said voltage selecting circuit includes:

a voltage dividing circuit, coupled to said first input electrical potential and said second input electrical potential, and dividing said input voltage for producing a plurality of divided electrical potentials; and a switching circuit, coupled to said divided electrical potentials of said voltage dividing circuit, and switching said divided electrical potentials as said first reference electrical potential and said second reference electrical potential.

8. The display driving circuit of claim 7, wherein said voltage selecting circuit includes a voltage regulator, coupled between a plurality of resistors of said voltage dividing circuit, and clamping a voltage dividing range of said resistors.

9. The display driving circuit of claim 6, wherein said voltage source generation circuit includes:

a first voltage source circuit, coupled to said first input electrical potential, said second input electrical potential, said first reference electrical potential, and a first feedback electrical potential, and producing said first supply electrical potential according to said first feedback electrical potential and said first reference electrical potential; and a second voltage source circuit, coupled to said first input electrical potential, said second input electrical potential, said second reference electrical potential, and a second feedback electrical potential, and producing said second supply electrical potential according to said second feedback electrical potential and said second reference electrical potential.

10. The display driving circuit of claim 9, wherein said first voltage source circuit includes:

a first operational circuit, including a first input terminal, a second input terminal, and an output terminal, said first input terminal coupled to said first feedback electrical potential, said second input terminal coupled to said first reference electrical potential, and said output terminal outputting a first control signal;

a first output element, coupled to said first input electrical potential and said output terminal of said first operational circuit, and producing said first supply electrical potential according to said first control signal and said first input electrical potential; and a first voltage dividing circuit, coupled to said first output element, said second input electrical potential, and said first input terminal of said first operational circuit, and dividing the electrical potential difference between said first supply electrical potential and said second input electrical potential for producing said first feedback electrical potential.

11. The display driving circuit of claim 9, wherein said second voltage source circuit includes:

terminal, and an output terminal, said first input terminal coupled to said second feedback electrical potential, said second input terminal coupled to said second reference electrical potential, and said output terminal outputting a second control signal;

a second output element, coupled to said second input electrical potential and said output terminal of said second operational circuit, and producing said second supply electrical potential according to said second control signal and said second input electrical potential; and a second voltage dividing circuit, coupled to said second output element, said first input electrical potential, and said first input terminal of said second operational circuit, and dividing the electrical potential difference between said first input electrical potential and said second supply electrical potential for producing said second feedback electrical potential.

12. A display driving circuit, comprising:

a power circuit, receiving an input voltage, said input voltage being the electrical potential difference between a first input electrical potential and a second input electrical potential, producing only a first supply electrical potential and only a second supply electrical potential according to said first input electrical potential and said second input electrical potential for providing a supply voltage, said supply voltage being the electrical potential difference between said first supply electrical potential and said second supply electrical potential, said first supply electrical potential being higher than said second supply electrical potential, and said second supply electrical potential being between said first input electrical potential and said second input electrical potential, the electrical potential difference between said first supply electrical potential and said second supply electrical potential being smaller than said electrical potential difference between said first input electrical potential and said second input electrical potential; and a panel driving circuit, coupled to said first supply electrical potential and said second supply electrical potential for receiving said supply voltage and generating a plurality of driving signals;

wherein said power circuit produces a first output voltage and a second output voltage both as said supply voltage according to said input voltage; said first output voltage is the electrical potential difference between said first supply electrical potential and a reference electrical potential; said second output voltage is the electrical potential difference between said second supply electrical potential and said reference electrical potential, said reference electrical potential is different from said second input electrical potential, said panel driving circuit includes:

a gamma circuit directly coupled to said first supply electrical potential and said second supply electrical potential of said power circuit, and producing a plurality of gamma voltages solely based upon the electrical potential difference between said first and said second supply electrical potentials formed by the electrical potential difference between said first and second output voltages;

a plurality of buffer circuits, coupled to said gamma circuit, and receiving and buffering said gamma voltages for generating a plurality of buffer voltages; and a plurality of digital-to-analog converters, coupled to said buffer circuits, receiving said buffer voltages and a plurality of pixel data, and selecting said buffer voltages according to said pixel data for generating said driving signals.

* * * * *